United States Patent
Glozman et al.

(10) Patent No.: US 7,026,909 B2
(45) Date of Patent: Apr. 11, 2006

(54) HOUSING FOR TEMPERATURE SENSING ASSEMBLIES IN A THERMOMETER

(75) Inventors: Irene Glozman, Eagan, MN (US);
Richard W. Phillips, Eagan, MN (US);
James R. Powell, Lakeville, MN (US)

(73) Assignee: Rosemount Aerospace, Inc., Burnsville, MN (US)

( * ) Notice: Subject to any disclaimer, the term of this patent is extended or adjusted under 35 U.S.C. 154(b) by 0 days.

(21) Appl. No.: 10/734,733

(22) Filed: Dec. 12, 2003

(65) Prior Publication Data
US 2005/0129089 A1    Jun. 16, 2005

(51) Int. Cl.
*H01H 7/02*    (2006.01)
(52) U.S. Cl. .......................... 338/28; 338/229; 374/185
(58) Field of Classification Search .................. 338/25, 338/38, 229, 238; 374/185
See application file for complete search history.

(56) References Cited

U.S. PATENT DOCUMENTS

| | | | | |
|---|---|---|---|---|
| 2,307,626 A * | 1/1943 | Kelly | ............................ | 338/28 |
| 2,780,703 A * | 2/1957 | Macintyre | ..................... | 338/28 |
| 3,286,214 A * | 11/1966 | Kolb et al. | .................. | 338/269 |
| 3,499,217 A | 3/1970 | Mochizuki | .................... | 29/612 |
| 3,798,760 A | 3/1974 | Carlson et al. | ............... | 29/612 |
| 4,398,169 A * | 8/1983 | Hayashi | ........................ | 338/25 |
| 4,575,705 A * | 3/1986 | Gotcher | ........................ | 338/28 |
| 4,586,246 A * | 5/1986 | Oskoui | ........................ | 29/612 |
| 4,934,831 A * | 6/1990 | Volbrecht | .................... | 374/183 |
| 5,309,133 A * | 5/1994 | Berger et al. | ............. | 338/22 R |
| 5,743,646 A * | 4/1998 | O'Connell et al. | ......... | 374/148 |
| 6,592,253 B1 * | 7/2003 | Nyffenegger et al. | ....... | 374/143 |
| 2002/0084884 A1 * | 7/2002 | Takahashi et al. | ............ | 338/25 |

OTHER PUBLICATIONS

Copy of International Search Report.
Copy of Written Opinion.

* cited by examiner

*Primary Examiner*—Kyung Lee
(74) *Attorney, Agent, or Firm*—Westman, Champlin & Kelly, P.A.

(57) ABSTRACT

A platinum resistance thermometer has an outer housing with a bore that receives a temperature sensor assembly including a mandrel having a sensing section with a platinum wire wound thereon and supported in the bore with a non-cohesive powder material that will distribute stresses caused by differential thermal expansion between the housing and the temperature sensor assembly. A second portion of the mandrel is supported in the bore with a rigid epoxy to mechanically support the sensor assembly with the sensing section cantilevered from the rigid epoxy.

17 Claims, 2 Drawing Sheets

HOUSING FOR TEMPERATURE SENSING ASSEMBLIES IN A THERMOMETER

BACKGROUND OF THE INVENTION

The present invention relates to a housing for a temperature sensor assembly used in a thermometer where the housing material and the sensing element assembly material have different coefficients of thermal expansion. The sensing assembly includes a mandrel having an element section supported in a bore in the housing with an electrically insulating, compliant potting material, comprised of loose powder, while a support section of the mandrel is held in place with a rigid potting material at an outer end of the bore. The powder provides a necessary cushion and limits displacement of the temperature sensing element during vibration and mechanical and thermal shock, while the mandrel support section is held securely in place with the rigid potting material.

Resistance temperature thermometers are well known, and in many applications they are made with a platinum resistance wire element wound onto the sensing element section of a mandrel. The resistance element can be a thin wire, or a thin film, with the mandrel supported in a suitable heat conducting housing, and potted in place in a bore in the housing. The housings are generally aluminum, aluminum alloys, stainless steel or other heat conducting material with a high coefficient of thermal expansion, and the mandrels are generally made of a material that has a much lower coefficient of thermal expansion. The potting material also has a different coefficient of thermal expansion from the other materials. When using a wire wound thermometer the wire is wound on the outer surface of the mandrel, and may be protected from the elements with a thin layer of glass. Expansion and contraction of the surrounding housing material has a significant effect on the thermometer performance. The differences in the coefficient of thermal expansion between the housing material, the core or mandrel material, and the potting material, create internal stresses and strains on the wire element as the environmental temperature changes.

In normal use, such as in space vehicle applications, the temperature sensor will be subjected to cryogenic temperatures as well as high heat, so that there is a significant range of sensed temperatures that will cause stresses due to the differences in coefficient of thermal expansion. The support for the sensing element has to be capable of withstanding high vibration and shock loads without damage, and without affecting the sensor accuracy.

SUMMARY OF THE INVENTION

The present invention relates to a thermometer that has a temperature sensing element assembly mounted in a housing. The temperature sensing element assembly comprises a solid core mandrel made of a suitable support material having a resistance temperature sensor wire or other sensing element on the exterior surface of a first section of the mandrel. A second section of the mandrel is not used for supporting a temperature sensing element.

The outer housing has a bore or well that receives the temperature sensing element assembly with the first section of the mandrel positioned in an inner or first portion of the bore in the housing. The second section of the mandrel forms a support section and is in a second portion of the bore.

A compliant loose media is used for potting the first section of the mandrel having the sensing element on it in a first bore portion to provide a support relative to the interior surface of the bore. The second section of the mandrel, which does not support a temperature sensing element, is rigidly held in the second outer portion of the bore with a suitable rigid potting compound. The first mandrel section is cantilevered from the rigidly supported outer end section. The compliant potting material surrounding the sensing element and first mandrel section acts to distribute stresses caused by differential expansion or contraction of the housing and sensor assembly. The compliant potting material preferably is a low cohesion media, preferably a particulate material of very small, solid particles or powder that will shift to distribute any stresses caused by differential expansion between the housing and the temperature sensing assembly. The stresses are distributed equally in all directions.

The low cohesion media is contained in the inner bore portion in the housing that surrounds the first section of the mandrel and the sensing element. The rigid potting material for the second support section of the mandrel acts to contain the low cohesion media in place. Also, the rigid potting material supports the entire mandrel relative to the housing during vibration, or mechanical shocks, and avoids calibration shifts that might occur if the low cohesion potting material was providing the only support for sensing the entire temperature assembly.

The powder or particulate material that forms a low cohesion potting material is selected to have a high thermal conductivity, and high electrical insulating properties so that the response time of the temperature sensor is acceptable and the resistance wire element does not experience short circuits.

Rigid potting materials, such as epoxies, have long been used for mounting resistance sensors throughout their length, and similar epoxy materials can be used for securing the support end section of the mandrel to ensure that the temperature sensor assembly will be adequately supported during vibration or mechanical shocks.

A suitable loose powder potting material, such as aluminum oxide ($Al_2O_3$), magnesium oxide (MgO), powdered boron nitride (BN), or aluminum nitride (AlN) which have good thermal conductivity, high electrical insulative properties and will provide distribution of stresses and strains at cryogenic temperature can be used. These materials are preferably in fine powder form, having a particle size of 325 mesh sieve size (ASTM-E11) (45 micron openings) or finer. Such materials are capable of being adequately packed into the housing bore to surround the sensing wire and mandrel sections. Particles in the range of 7 microns mean particle size have been used.

Once the powder or particulate material is adequately packed in place, using techniques that can be varied depending on clearances and materials, and after the powder has been dried (it is usually introduced as a slurry) the rigid epoxy potting material can be put into place to support the end of the mandrel relative to the housing. The arrangement ensures good performance during vibration and mechanical or thermal shocks, because the rigid epoxy provides the structural support for the sensing element assembly, and the powder provides the necessary cushion for distributing stresses on the sensing element caused by differential thermal expansion, and also limits the displacement of the sensing element relative to the housing.

DETAILED DESCRIPTION OF THE PREFERRED EMBODIMENTS

Figure 1:
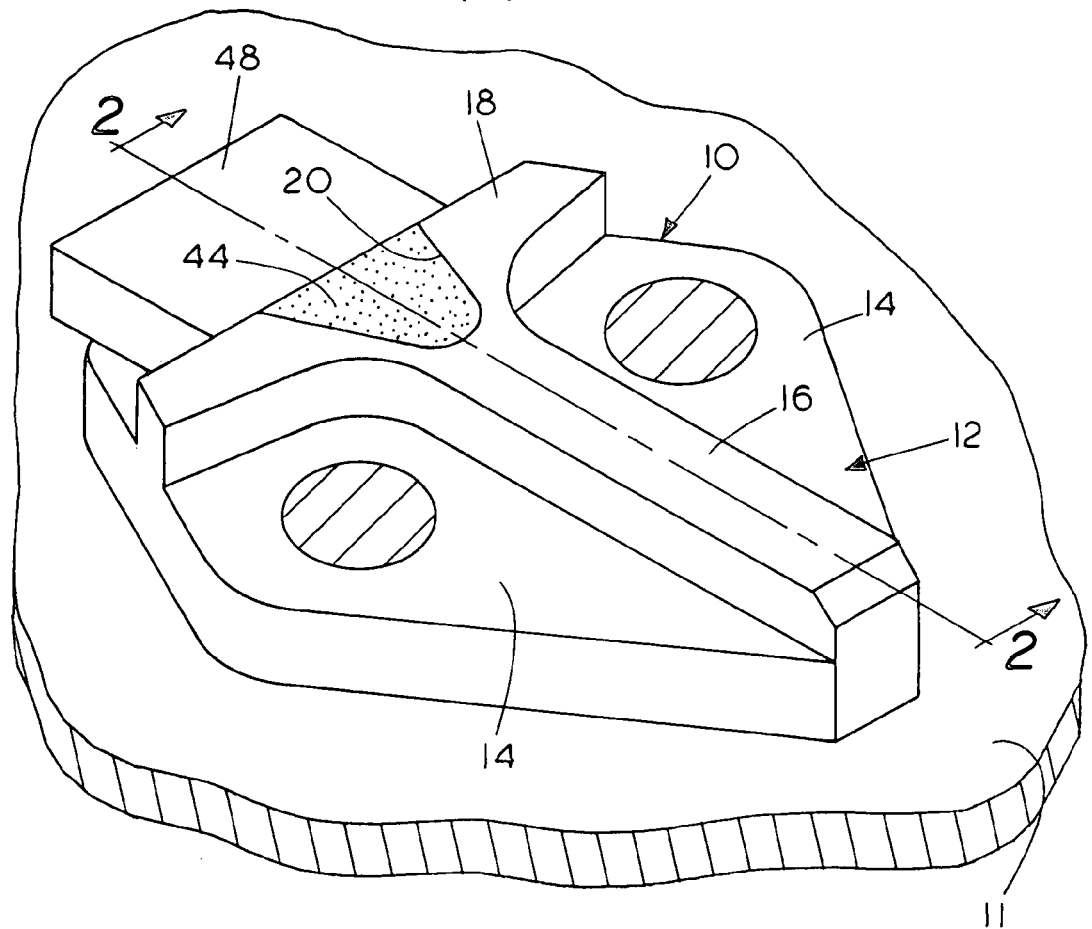
FIG. 1 is a perspective view of a thermometer made according to the present invention.
Figure 2:
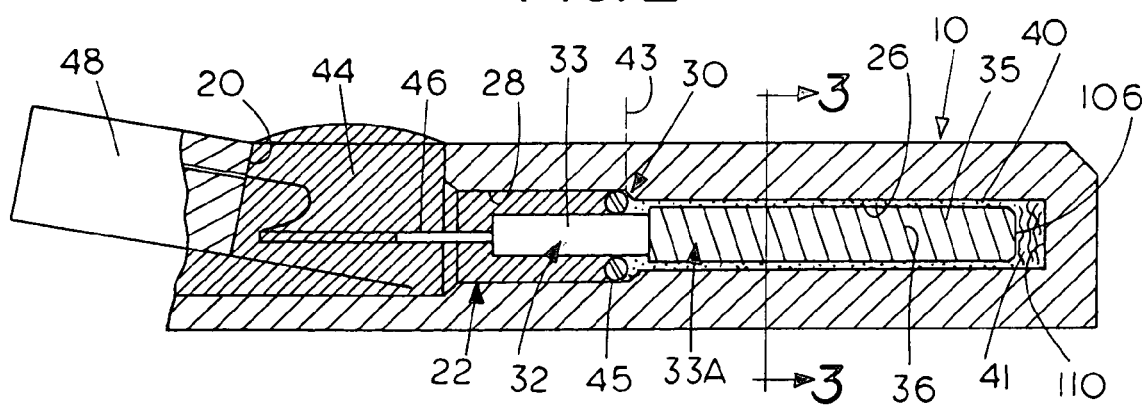
FIG. 2 is a sectional view taken along line 2—2 in FIG. 1.
Figure 3:
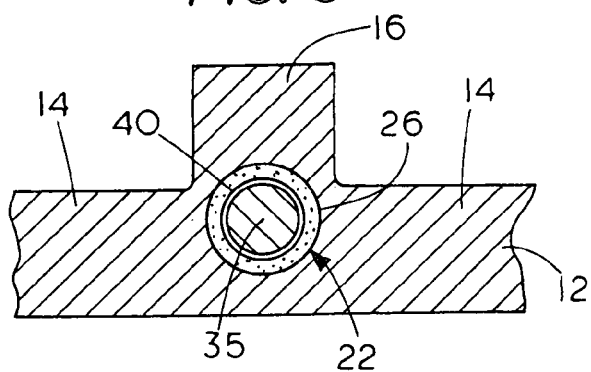
FIG. 3 is a sectional view taken along line 3—3 in FIG. 2.

A thermometer made according to the present invention is indicated in FIG. 1 at 10, and includes an outer housing 12 that as shown has flat plate portions 14 alongside a central rib 16. The exterior configuration can be selected to suit the application where the thermometer is used. The sensor can be mounted on a surface of a component 11 of a space vehicle, for example. The rib extends into a T-shaped header 18, and as shown in FIG. 1, the header 18 has an opening or bore 20 that connects to a two section longitudinally extending bore 22. The bore 22 has a sensor element bore section 26, and a sensor assembly support bore section 28. The bore sections 26 and 28 are joined by a shoulder 30.

Figure 4:
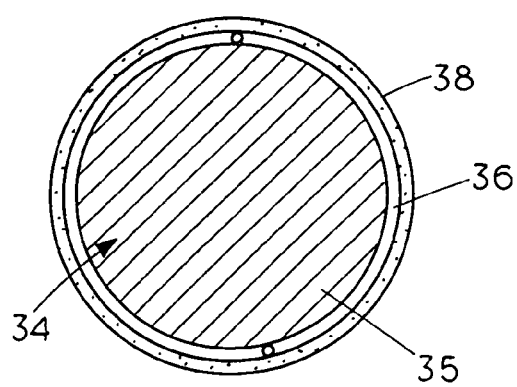
FIG. 4 is an enlarged sectional view of a mandrel schematically showing a mandrel with a resistance wire and a protective glass layer in place.

A temperature sensing assembly or sensor assembly 32 includes a unitary central core or mandrel 34 having a first mandrel section 35 on which a platinum resistance wire temperature sensing element 36 is wound in a suitable manner to form a temperature sensing section 33A of the temperature sensor assembly. As shown in FIG. 4, the wire temperature sensing element is covered with a thin protective layer of glass 38. The temperature sensor assembly 32 is made in a conventional, known manner.

The mandrel 34 is unitary and has an integral second support section 33, which is at an outer end and which has no temperature sensing element supported on it. The mandrel 34 can be made of a solid, rigid material such as a platinum-rhodium alloy. The temperature sensing element 36 can comprise a thin high resistance platinum wire, or in certain applications a thin film can be supported on the first section 35 of the mandrel.

For high resistance values, the platinum resistance element is usually fabricated with a fine wire that is wound on the external surface of solid core mandrel in a helical pattern.

The outer housing 12 is generally made of a high thermal conductivity material, such as aluminum, aluminum alloys or stainless steel and having a close thermal coupling between the housing and the resistance temperature sensing element 36 is important. Several other considerations for selection of material besides thermal conductivity include weight (density), strength, ease of machining, corrosion resistance, and cost. For space applications, aluminum and aluminum alloys represent a good balance.

As was stated above, the coefficient of thermal expansion of aluminum is generally substantially different from the coefficient of thermal expansion of materials that are suitable for the mandrel or core 34 and the resistance wire temperature sensing element 36. Internal stresses and strains on the resistance temperature sensing element will occur during contraction and expansion, as the thermometer 10 is subjected to temperature extremes if the temperature sensor section is rigidly potted in place. In order to minimize the internal stresses on the temperature sensing element 36 and to distribute the stresses and strains in all directions around the sensing element 36 more equally, the smaller diameter sensor element bore section 26 is formed to be slightly larger than the section 33A of the temperature sensing element assembly 32 on the first mandrel section 35 where the resistance wire 36 is wound. The mandrel section 35 is surrounded and supported with a low cohesion loose powder media indicated at 40 that is suitably packed in place around the first mandrel section 35. A small plug of quartz wool or other fibrous insulating material 41 is placed in a space between an inner end 100 of the mandrel section 35 and the bottom 100 of the well or small diameter bore section 26. This quartz wool provides support as the sensor assembly 32 is inserted into the bore 26. The quartz wool 41 fills a space that can be difficult to pack with the powder media 40.

A suitable low cohesion media powder 40 such as powdered aluminum oxide ($Al_2O_3$), which is made in a very fine mesh, for example 325 mesh sieve size or finer, is potted into the annular space between the temperature sensing assembly section 33A and the interior surface of the bore section 26 using known techniques. Usually deionized water and the powder material 40 are added to the bore in the housing 12 and the water and powder forms a slurry that is placed in the space by centrifuging with the temperature sensor assembly positioned within the bore section 26. The process is carefully monitored to make sure that the entire surface of the temperature sensing section 33A is well supported on the particulate or powder material. It has been found that small particles, for example, 7 micron mean particle size, pack well. After centrifuging the potting powder material is dried in an oven at suitable temperature (120° C.) to avoid sintering and particle adhesion. No binder is used in the powder material so that the individual particles of the powder or particulate material will shift or slip relative to each other under loads, to distribute stresses caused by differential thermal expansion between the housing 10 and the sensor assembly 72. The powder particles also will provide support for the temperature sensing section 33A and because they are thermally conductive, will provide thermal conduction from the housing 10 to the sensing element 36.

In order to support the temperature sensor assembly 32 in the housing 10 against vibrations and mechanical shock loading, the mandrel 34 has the second support section 33 which extends outwardly from an interface line 43 at shoulder 30 joining the bore sections 26 and 28 where the low cohesion media filling is terminated. The sensor assembly support bore section 28, and the end bore or opening 20 are filled with a rigid potting material 44, that will rigidly and securely support the second mandrel support section 33 of the mandrel 34 relative to the housing 10. The rigid potting material is formed into a convex (domed) shape at the top of the opening, to extend above the top surface of the housing portions 16 and 18.

Suitable leads 46 extend from the temperature sensing wire or film 36 into the bore or opening 20, and are connected to a suitable connector 48 that is also held in place with a suitable rigid potting material 44 such as an epoxy, or cement.

The rigid potting material 44 is also used as a plug to hold the low cohesion powder potting material 40 in place, at the interface or shoulder 30 between the two bore sections 26 and 28. Preferably an elastomeric O-ring 45 can be placed at this junction for forming a radial seal, which prevents the epoxy from wicking into the material 40. If desired, a metal ring or bushing can be used instead of the O-ring. The metal ring would be brazed to the OD of mandrel section 33 and to the ID of the bore section 28.

In addition, the potting material 44 securely holds the outer end second mandrel support section 33 so that the mandrel section 35 is held as a cantilever beam. This ensures good performance of the temperature sensing element 36 during vibration and mechanical and thermal shock because the rigid potting material 44 provides structural support, and the low cohesion media or powder 40 provides a necessary cushion and also limits displacement of the mandrel section 35 and the resistance element or wire 36.

While aluminum oxide has been found to be a preferred powder or potting material 40 for the temperature sensing section 33A, other types of low cohesion loose powder media that provide for adequate thermal conduction to the sensing element, and adequate distribution of stresses from differential expansion between the housing and the sensor element assembly can be used, such as powdered magnesium oxide, boron nitride and aluminum nitride. Additional potting materials that distribute stresses in substantially all directions can also be used.

The rigid support potting material 44 at the support end portion of the mandrel section 33 essentially cantilevers the sensing element section 33A from a rigid or fixed support. Epoxy sold under the trademark Stycast® #2850 and epoxy sold under the marks Tra-Con® and Tri-bond® 816 HO1 have been found to be suitable rigid epoxies, but other epoxies having similar characteristics can be utilized, as well as cements, as long as the mandrel support section 33 is held rigidly relative to the housing 10.

Figure 5:
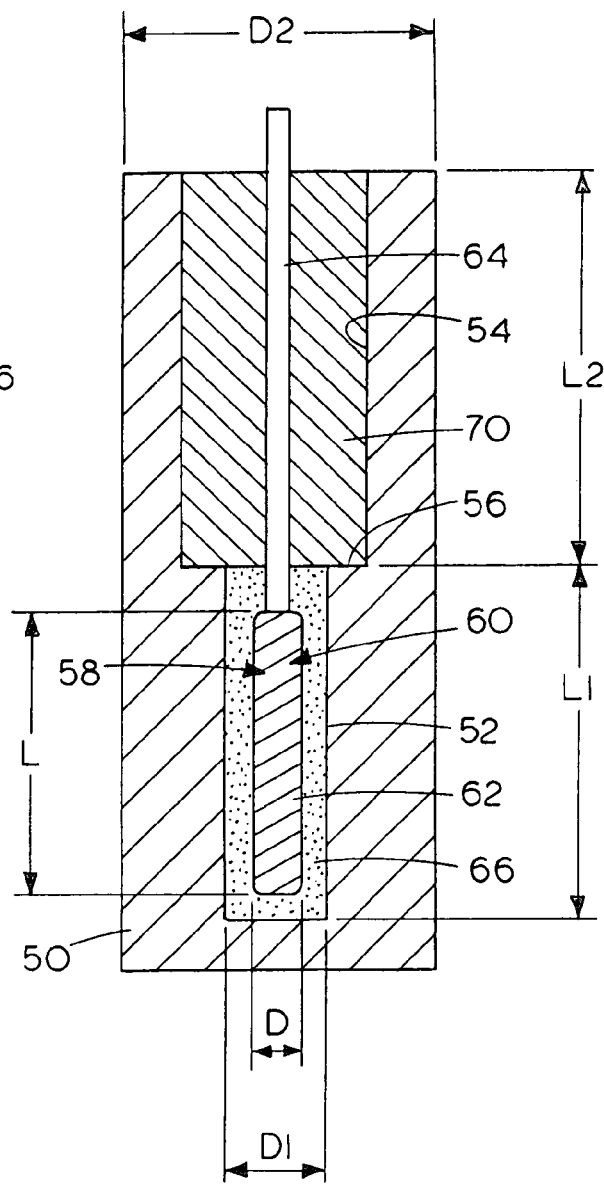
FIG. 5 is a schematic representation of a sensor assembly in a modified housing.

FIG. 5 is a schematic representation of a simplified form of the invention, where the outer housing 50 has first well or bore section 52, and a second well or bore section 54, joined by a shoulder 56. A temperature sensing assembly indicated generally at 58 has a mandrel assembly 60, made up of two sections including a temperature sensing element section 62 that includes a platinum resistance wire, as previously explained, and an assembly support section 64, which is of smaller diameter compared to the assembly support shown in FIGS. 1–4.

The temperature sensing element section 62 is located in the bore 52 and is supported by a low cohesive or shock absorbing loose powder or particulate potting material 66, which can be aluminum oxide, or other materials that will distribute stresses caused by differential expansion between the housing 50 and the temperature sensing assembly 58. The potting material 66 is capped or held in place by an epoxy or other rigid potting material 70 that rigidly supports the mandrel support section 64. The support section 64 forms a cantilever support for the temperature sensing section 62 to resist mechanical shock and vibrations.

The diameter D of the temperature sensing section 60 is suitably smaller than the diameter D1 of the bore section 52, to provide sufficient space for the low cohesive or stress distributing potting material 66 to pack in place. Diameter D2 of bore section 54 is larger than both diameters D and D1. The lengths L1 and L2 can be selected to match the mandrel size. The length L of the temperature sensing element section 62 is shown less than the dimension L1 of the bore section 52 so that the low cohesive loose powder potting material 66 will completely surround and support the temperature sensing element section 62.

The temperature sensing assembly 58, mounted in a housing 50 as shown, provides accurate temperature readings across a wide range of temperatures, with fast response even with substantial differences in coefficients of the thermal expansion of components.

The space between the powder particles is filled with dry air after the drying of the material, or the space can be filled with helium to enhance thermal conductivity in the section filled with powder. Helium filling is, most beneficial at temperatures below 77K, at which point the air would condense.

Although the present invention has been described with reference to preferred embodiments, workers skilled in the art will recognize that changes may be made in form and detail without departing from the spirit and scope of the invention.

What is claimed is:

1. A thermometer assembly comprising a housing, a bore within said housing, and a temperature sensing assembly comprising a rigid mandrel having a length with first and second sections, the first section having a resistance wire temperature sensing element helically wound onto and supported along a length thereof, wherein the first section of the mandrel and the supported resistance wire temperature sensing element is positioned in a first inner portion of the bore and surrounded by particulate material in the bore, and the second section of the mandrel is positioned in a second outer portion of the bore and surrounded by a rigid potting material in the second outer portion of the bore to form a rigid support in the housing for the rigid mandrel section, and the first rigid mandrel section being cantilevered from the second mandrel section and being cushioned by the surrounding particulate material in the first inner portion of the bore.

2. The thermometer assembly of claim 1 wherein the second portion of the bore is of larger diameter than the first portion, the second portion surrounding the second section of the mandrel and being filled with the rigid potting material.

3. The thermometer of claim 1 wherein said particulate material supporting the first section comprises a material selected from the group consisting of aluminum oxide, magnesium oxide, boron nitride and aluminum nitride.

4. The thermometer assembly of claim 1 wherein said particulate material is a heat conductive, electrically insulating powder having particles of a sieve size of less than 325 mesh.

5. The thermometer assembly of claim 1 wherein the particulate material is a powder with a mean particle size of about 45 microns or less.

6. The thermometer assembly of claim 1 wherein said rigid potting material comprises an epoxy material.

7. The thermometer assembly of claim 1 wherein said temperature sensing element comprises a platinum resistance wire wound on an outer surface of the first section of the mandrel.

8. The thermometer assembly of claim 3 wherein the particulate material is aluminum oxide powder having a mean particle size of about 7 microns.

9. The thermometer assembly of claim 1, wherein the bore portions are connected by a shoulder surface, and the rigid potting material forms an end cap adjacent the shoulder for retaining the particulate material in the first bore portion.

10. The thermometer assembly of claim 1 wherein the housing has a coefficient of thermal expansion substantially greater than the mandrel.

11. The thermometer assembly of claim 10 wherein the housing is made of aluminum, and the mandrel is made of a platinum-rhodium alloy material.

12. The thermometer assembly of claim 1 wherein the bore has an inner end surface and wherein the first section has an end surface spaced from the inner end surface, and separate insulating material filling a space between the inner end surface of the bore and the end surface of the first section.

13. A thermometer assembly comprising a housing, a bore within said housing, the bore having a closed end, and a temperature sensing assembly comprising a rigid material mandrel having first and second integral sections, the first section having an exterior surface surrounding the first section, a resistance temperature sensing element encircling and supported entirely on the exterior surface of the first section, the first section of the mandrel being positioned in a first portion of the bore and surrounded by particulate material to support the first section in the bore of the housing, and the second section of the mandrel being positioned in a second portion of the bore and surrounded by a rigid potting material that fills the bore to rigidly support the first section relative to the housing only.

14. The thermometer of claim 13 wherein said temperature sensor element comprises a resistance wire wound over the exterior surface of the first section of the mandrel only.

15. A thermometer assembly comprising a housing, a bore formed within said housing and having a closed end and an open end, a temperature sensing assembly in the bore comprising a support mandrel having first and second integral sections coaxially extending along a length, the first section having an outer surface surrounding the first section and extending for a length, a resistance wire temperature sensing element wound around and supported entirely on the outer surface of the first section, the first section of the mandrel being positioned in the bore adjacent the closed end and surrounded by shock absorbing particulate material to support the first section -in the bore, and the second section of the mandrel extending from the first section to a second portion of the bore toward the open end and surrounded and retained in the bore relative to the housing by a rigid potting material in the second portion of the bore, wherein the first section and supported resistance temperature sensing element are held as a cantilever beam by the second section and are cushioned during vibration of the thermometer by the shock absorbing particulate material.

16. The thermometer assembly of claim 15 wherein the second portion of the bore is of larger diameter than the first portion of the bore.

17. The thermometer of claim 15, wherein the particulate material comprises the only material between the first mandrel section and a surrounding inner surface of the first portion of the bore.

* * * * *